July 25, 1933.  J. H. WHITE  1,919,267
ELECTRIC INSULATION
Filed March 18, 1926  3 Sheets-Sheet 1

Inventor:
John H. White
by J.C. Roberts  Atty.

July 25, 1933.  J. H. WHITE  1,919,267
ELECTRIC INSULATION
Filed March 18, 1926   3 Sheets-Sheet 2

Inventor:
John H. White
by  Atty.

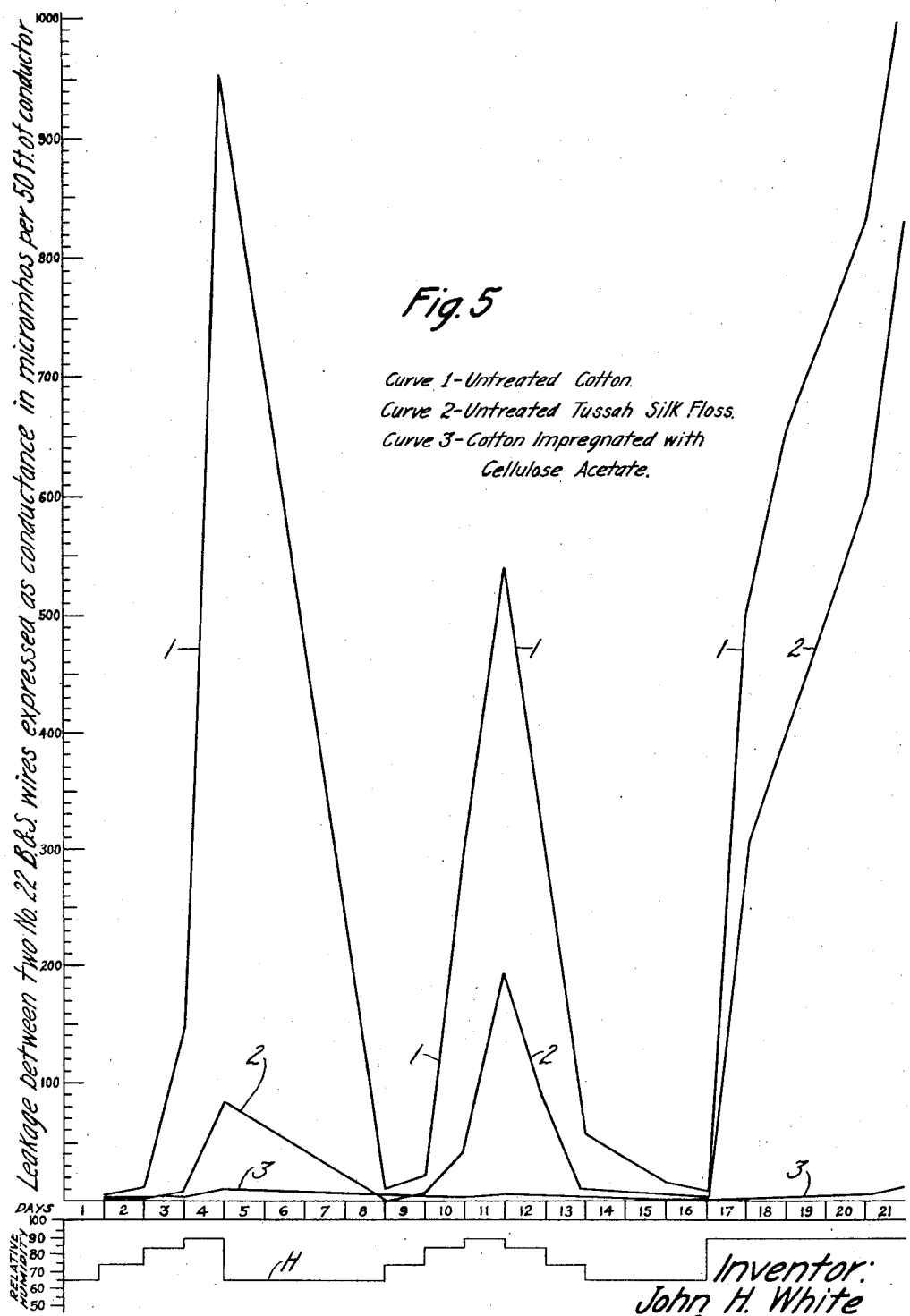

Patented July 25, 1933

1,919,267

UNITED STATES PATENT OFFICE

JOHN H. WHITE, OF CRANFORD, NEW JERSEY, ASSIGNOR TO WESTERN ELECTRIC COMPANY, INCORPORATED, OF NEW YORK, N. Y., A CORPORATION OF NEW YORK

ELECTRIC INSULATION

Application filed March 18, 1926. Serial No. 95,566.

This invention relates to electric insulation and in a specific aspect to insulated flexible conductors and cables.

The invention is especially applicable to telephone switchboard cables and distributing frame wire which are used extensively in telephone exchanges.

An object of the invention is to improve the insulation characteristics of electric insulation and particularly of insulated signaling conductors.

Another object of the invention is to eliminate air-gaps and interstices from insulation produced by impregnating fibrous or porous insulating material with liquid insulating material.

This application is in part a continuation of application Serial No. 750,718, filed November 19, 1924.

The mechanical and electrical requirements of telephone switchboard cables are very severe. From a mechanical viewpoint the cable must be flexible enough for use in a telephone exchange, for example, to allow frequent bending and twisting, as well as to permit a group of cables to be wedged apart for the purpose of making necessary electrical connections.

From an electrical viewpoint, the individual conductors must be far enough apart to keep down the capacity, and the pairs of conductors constituting a circuit must be twisted in order to avoid crosstalk. Most important of all, perhaps, the insulation resistance of the individual conductors must be high.

It is well known that different insulating materials vary widely in their electrical insulation resistance properties. Fibrous materials, such as cotton and tussah floss silk, possess good insulation resistance properties when dry, but it has been found that when these materials are exposed to moist air their insulation resistance values are considerably lowered. Regardless of their relative insulating properties, the insulation resistance values of all such materials fall off rapidly under rising humidity conditions.

There is a distinction, however, between the requirements of moisture-proof telephone exchange switchboard cable and waterproof cable of the type which may be exposed to rain, or such as is used for under-water signaling. The cables and apparatus on the inside of a telephone exchange may approach, but never reach, as low a temperature as the dew point, which is that temperature of an object at which actual dew will form from the atmosphere on that object.

Furthermore, since telephone switchboard cables in use are usually carrying some current, through some of the conductors, the cable is usually slightly warmer even than the room temperature and is never below the dew point even during a rain storm.

However, the switchboard cable in a telephone exchange, while never submerged in water or even covered with dew, is at all times under the influence of the deleterious action of moisture which is always present in the air in varying amounts depending upon climatic and humidity conditions. This is due to the fact that most substances, especially those containing saline matter, are hygroscopic, that is, they become actually wet even though at a temperature above the dew point.

While the amount of water absorption is not necessarily a direct and proportionate measure of the insulation resistances of fibrous insulating materials, nevertheless the presence of water in all cases produces a deleterious effect upon the insulation resistance properties. The presence of water in a switchboard cable establishes low resistance paths betwen the various conductors, thus destroying their efficiency for purposes of telephonic communication, and also sets up an electrolytic action which decomposes the conductors and ultimately renders the cable unfit for service.

Since it is inexpedient for mechanical reasons to cover a switchboard cable with a hermetically impervious sheath, such as a lead pipe, it will be seen that the ability of the cable to resist the action of moist air must be very high.

A switchboard cable which has been successfully used under medium humidity conditions consists of a plurality of black enamel coated conductors, each having one, two or even three wrappings of floss silk, these conductors being twisted in pairs and assembled in layers with interleaving hard paper strips, forming a pliable group of conductors. Such a group of conductors is then overwound with tapes of cloth, tinfoil and a braid covering which is painted, preferably with fire-proof paint.

Although dry floss silk possesses excellent properties of insulation resistance, it will be seen from the above that elaborate precautions are taken to minimize the effect of moisture which would tend to reduce its insulation resistance. The enamel coating is employed to exclude moisture, but does not of itself render the conductor moisture-proof since commercial enameled wire frequently contains pin holes or gaps which are formed either during the coating process or by cracking the enamel by bending or twisting the wire.

Such cables, however, are open to important objections, such as the difficulty of soldering the enameled wire and the high cost and limited supply of floss silk. Furthermore, even with all the above precautions taken, under extreme humidity conditions the action of moisture has been found to injure the cable rapidly.

This invention overcomes the difficulties outlined above by providing a cheap and efficient telephone exchange switchboard cable, the insulation resistance of which remains substantially unaffected by all weather conditions even those of the most severe kind.

In accordance with one of its features, the invention provides a new and improved method of treating the individual conductors of a switchboard cable, in which the use of an enamel coating may in most cases be eliminated and in which cotton insulation is employed in place of the more expensive floss silk.

Briefly, this is accomplished by converting the rather hygroscopic cotton into such a condition that its insulation resistance is substantially unaffected by moist air, even when the air is as moist as 90% relative humidity in the heat of summer. The cotton insulation upon the conductor is thoroughly impregnated with a solution of cellulose acetate and is both impregnated and dried under such conditions that the insulation is prevented from being affected by the moisture in the air while the cellulose acetate solvent is evaporating and the cellulose acetate is hardening.

The result of this process is to produce a conductor provided with a glossy tube-like cover in which the fibrous materials are enclosed in a solid matrix of cellulose acetate. This insulating cover retains a high insulation resistance under substantially all humidity conditions encountered.

Although cotton insulation is somewhat repellent to the cellulose acetate solution, the impregnating process may be hastened and rendered more thorough by first treating the insulation with a priming agent designed to eliminate all air-gaps and to facilitate the entrance of the cellulose acetate solution into the pores and interstices of the insulation.

The impregnating bath consists of a solution of cellulose acetate dissolved in a solvent, such as acetone, both of which are substantially free from hygroscopic and electrolytic materials. The entire freedom of the impregnating materials from all such water attracting substances is an advantage, but when the method of impregnating according to this invention is followed, a good quality of these materials is sufficient. After a thorough impregnation, the insulated conductor is passed through a current of air to hasten the evaporation of the acetone, thereby leaving the conductor when dried with a smooth and glossy cover in which the fibres of insulation are enclosed in a matrix of cellulose acetate. The conditions under which the impregnated conductor is dried must be such that the insulation is prevented from being affected by the moisture in the air while the cellulose solvent is being evaporated and the cellulose acetate is hardening. To satisfy these requirements of drying, the relative temperatures of the impregnated wire and the atmosphere surrounding said wire during the drying operation are maintained at such values as to prevent the deposition of water upon the moist conductor which might be caused by the lowering of the temperature of the air which comes in contact with the conductor below the dew point of the air. This is likely to occur due to the fact that the acetone, like ether, gets very cold as it evaporates and may easily chill the wire below the dew point.

It has been previously proposed to enamel bare conductors with cellulose acetate lacquers, as well as to treat fabrics with cellulose acetate in order to produce a glossy finish. The use of cellulose acetate for insulating purposes in the electrical arts has heretofore proven, however, of little value except as a mere varnish.

Tests have shown that conductors coated with cellulose acetate lacquers are entirely unsuited for use in telephone switchboard cables because such a coating is easily chipped off when the conductor is bent or twisted. Furthermore, previously known methods of treating electrical apparatus with cellulose acetate have not been such as to increase the moisture resisting qualities of the insulation.

The various features and advantages of the invention are described in detail with reference to the accompanying drawings, in which:

Fig. 5 shows a series of curves illustrating the efficiency of telephone conductors insulated in accordance with the invention.

Figure 1:
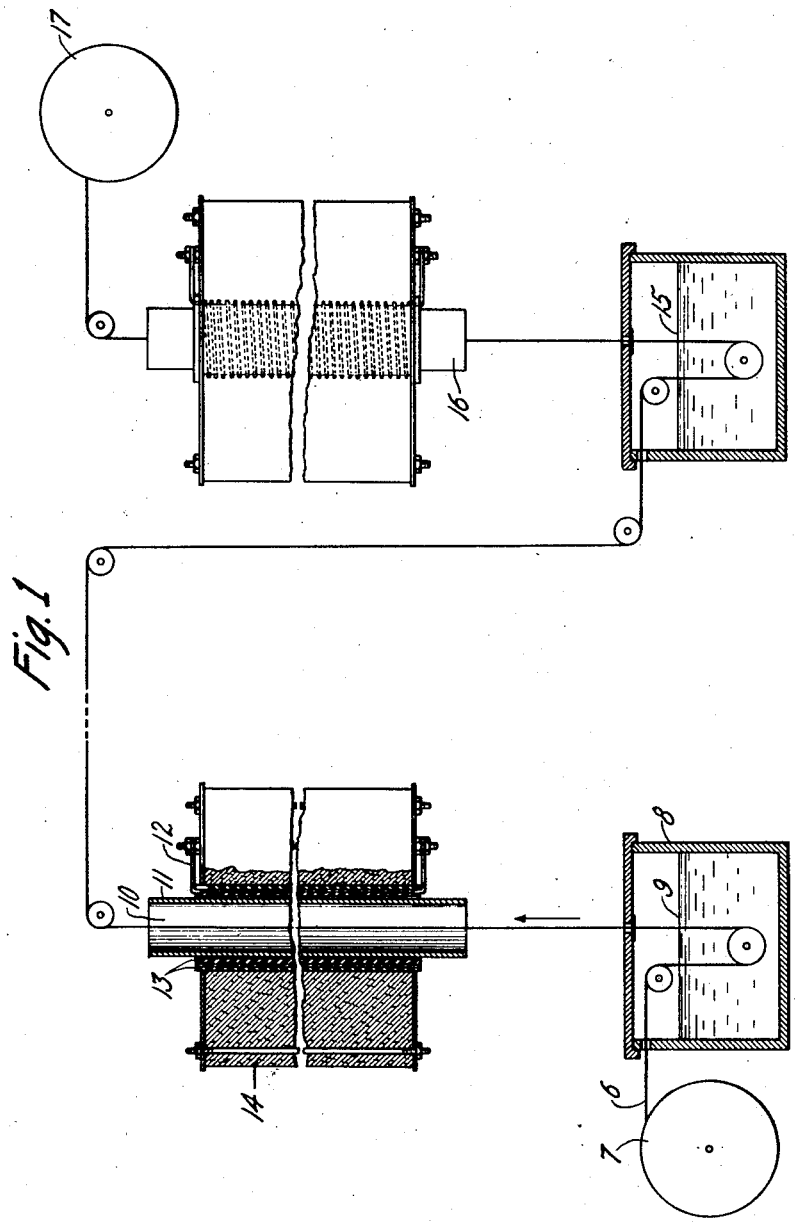
Fig. 1 is a sectional view illustrating a method of treating an insulated conductor in accordance with the invention.

As shown in Fig. 1, a conductor 6 insulated with cotton or other suitable insulating material is drawn from a supply reel 7 through an impregnating tank 8 containing a cellulose acetate bath 9. The conductor is then drawn from the tank 8 through a suitable drying chamber 10.

The drying chamber may consist of an electric furnace comprising a refractory core 11 wound with suitable resistance wire 12 enclosed within a second refractory tube 13 over which a suitable heat insulating material 14 is placed. The temperature employed within the furnace should be such as to provide the proper drying as the conductor passes through the furnace, and its actual value will depend upon the length of the furnace and the rate at which the conductor passes through the furnace.

The lower end of the furnace is preferably placed in close proximity to the top of the cellulose acetate bath container, though there need not be a direct connection between the two. In case there is no direct connection, the distance between the surface of the bath and the entrance of the furnace is preferably such that the radiation of heat from the furnace will maintain the temperature of the air in the intervening space high enough to prevent the deposition of moisture on the impregnated conductor due to the lowering of the temperature below the dew point.

With such an arrangement, a forced current of air is not necessary since the difference in temperature between the temperature of the air in the furnace and that without the furnace will be sufficient to provide a sufficiently rapid natural flow of air through the furnace to provide the proper drying.

The insulated conductor which is to be passed through the cellulose acetate bath 9 may comprise any number of layers of fibrous insulation. For example, the conductor may be insulated with a single layer of cotton yarn of sufficient coarseness to secure the desired separation between the conductors of the cable to keep down the capacity therebetween. It is obvious that it will be preferable to employ cotton yarn that is as little hygroscopic as possible, avoiding the use of cotton that has been bleached or otherwise treated in such a way as to increase its hygroscopic properties. If desired, the cotton may be tested either before or after being spun into yarn and if found to contain appreciable soluble hygroscopic and saline materials it may be put through an extensive treatment with pure hot water to remove such materials.

In some cases it may be desired to provide a cellulose acetate coating of greater thickness than can be efficiently provided with a single operation as outlined above. In such cases, the impregnated conductor, after leaving the dryer 10 may be passed through a second bath of cellulose acetate 15 and through a second dryer 16 to a suitable take-up reel 17.

The impregnated conductor emerges from the tank 8 through a small vent which may contain a wiper or scraper for removing the excess solution which clings to the insulation. The temperature of the air in the drying chamber is preferably maintained at about the temperature of the boiling point of acetone. The acetone in which the cellulose acetate is dissolved is rapidly evaporated in chamber 10, leaving a glossy coating upon the fibrous insulation, and the conductor is then drawn over a suitable guide roller, and if desired through the second impregnating and drying process, to the take-up reel 17. A scraper or smoothing die may be mounted on the inner wall of the chamber 10 in a manner similar to that shown near the top of the chamber 22 in Fig. 2, for the purpose of removing uneven particles of cellulose acetate which may tend to cling to the surface of the insulation, in order to give a smooth and polished appearance to the conductor. The exact point in the drying chamber to place such a die may be determined by trial.

In cases where it is desirable to decrease the repellent character of the cotton insulation to the cellulose acetate solution, the cotton insulation may be first treated with a priming agent which consists of a solvent of cellulose acetate, such as acetone. After this treatment, the insulated conductor is dried off to such a point that while insufficient liquid acetone is left in the fibres to disadvantageously dilute the cellulose acetate solution which is subsequently applied, still sufficient acetone vapor is left in the cotton insulation to displace the air.

Figure 2:
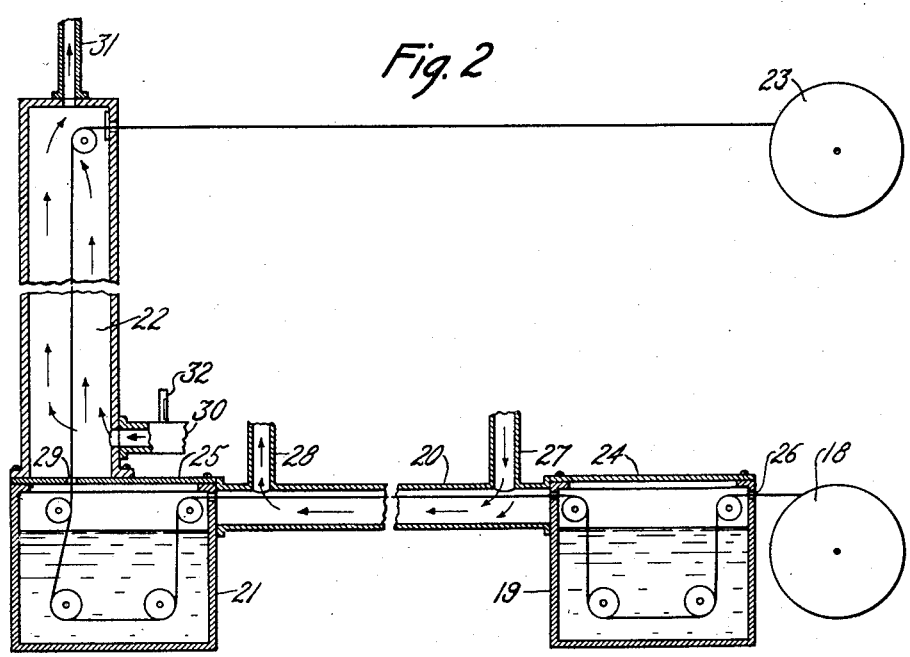
Fig. 2 is a sectional view illustrating another method of treating an insulated conductor in accordance with the invention.

This operation may be performed in such a way that the amount of acetone vapor left in the insulation is such that the unavoidable evaporation of the solvent, such as acetone, from the cellulose acetate solution, is made up by the acetone carried thereto in the insulation so that the cellulose acetate solution grows neither thinner nor thicker. In this way, the depth to which the insulation is impregnated may be varied as desired. A method including this step in accordance with the invention is shown in Fig. 2. Another method of producing a current flow of hot air through the drying chamber is also shown in this figure.

In Fig. 2, a conductor insulated with cotton or other insulating material is drawn from a supply reel 18 through an impregnating tank 19 containing acetone. From the tank 19, the conductor passes through a channel or chamber 20 to an impregnating tank 21 containing the cellulose acetate bath. The conductor is then drawn through the tank 21 and a drying chamber 22 to a suitable take-up reel 23.

The insulated conductor on the reel 18 may be heated to remove moisture before the impregnating process, though this step is not essential to the invention.

The tank 19 is provided with a tightly fitting cover 24, and the tank 21 is provided with a similar cover 25 to prevent the entrance of the outside air thereto. The chamber 20 is tightly fastened at one end to the tank 19 and at the other end to the tank 21 to prevent the entrance of the outside air thereto. The drying chamber 22 is similarly fixed to the cover 25 of the tank 21 thereby providing a continuous enclosed passage for the insulated conductor during the entire process. It has been found particularly desirable to exclude the outside air of the room from the entire process in cases where high humidity exists. It is also desirable to exclude the outside air of the room from the process where the fibrous covering is first given the treatment with the priming agent in order to prevent the imperfect impregnation of the resulting product.

The insulated conductor is drawn from the reel 18 through a small hole or vent 26 in the tank 19. The vent 26 is preferably just large enough to permit the passage of the conductor, and if desired may be fitted with a suitable stuffing material as an added precaution against the entrance of moisture to the tank. The tank 19 contains a bath of acetone free from moisture and from electrolytic and hygroscopic materials. The conductor is passed through the acetone over suitable guide rollers at such a rate as to allow the acetone to thoroughly impregnate the fibres of the insulation.

The insulated conductor impregnated with acetone is passed from the tank 19 through the chamber 20 to the impregnating tank 21. A strong current of hot dry air from an inlet supply pipe 27 is circulated through the chamber 20 to an outlet pipe 28 to hasten the evaporation of the liquid acetone contained in the insulation. The hot air is preferably maintained at about the temperature of the boiling point of acetone.

The passage of the conductor through the chamber 20 is preferably so regulated that the insulation will be dried to such a point that while insufficient liquid acetone is left in the insulation to disadvantageously dilute the cellulose acetate solution contained in the tank 21, still sufficient acetone vapor is left in the pores and interstices of the insulation to displace the air and also to compensate for the unavoidable evaporation of the solvent contained in the tank 21. The degree of evaporation may be controlled in several ways such as by properly gauging the length of the chamber 20 or by regulating the temperature and velocity of the hot dry air and by regulating the speed at which the conductor is drawn through the chamber 20.

The hot air containing the acetone vapor liberated in the chamber 20 is drawn off through the outlet pipe 28 to a suitable condensing apparatus (not shown) where the acetone is reclaimed and returned to the tank 19 for further use. Since the atmosphere above the free surface of the solution in the tanks 19 and 21 is saturated with pure heavy acetone vapor it will be seen that damp and other air is excluded from these tanks, thus reducing the tendency toward the formation of a film or skin on the top of the solutions contained therein.

The insulated conductor treated in the chamber 20 in the manner described above is drawn through the impregnating tank 21 containing the cellulose acetate bath.

After the impregnated conductor emerges from the tank 21 it is passed through a drying chamber which may be enclosed or which may be of the type described above in connection with Fig. 1. According to Fig. 2, the conductor passes through a small vent 29 in the air-tight cover 25 into the drying chamber 22. If desired, the vent 29 may contain a wiper or scraper for removing the excess solution which clings to the insulation. A strong current of hot dry air is circulated through the chamber 22 from an inlet pipe 30, which may be associated with the same source of supply as the inlet pipe 27 in the chamber 20, to an outlet pipe 31 which may be associated with the same condensing apparatus (not shown) to which the outlet pipe 28 is connected. The hot air is preferably maintained at about the temperature of the boiling point of acetone, and the temperature may be observed at all times by means of a thermometer 32 associated with the inlet pipe 30. Furthermore, the hot air employed in this drying step is made dry enough to prevent any deposition of water due to a lowering of temperature as a result of contact with the cooler conductor. The insulated conductor dried in this manner is drawn over a suitable guide roller through a vent in the chamber 22 to the take-up reel 23. A scraper or smoothing die may be mounted on the inner wall of the chamber 22 for the purpose of removing uneven particles of cellulose acetate which may tend to cling to the surface of the insulation. The exact point in the drying chamber to place the die may be obtained by trial.

Another method of preventing the deposition of moisture on the impregnated conductor during drying, due to a lowering of the temperature below the dew point is to maintain the temperature of the conductor itself above the dew point of the surrounding air. This method may be combined with a method employing a forced draft to cause a drying of the conductor, or, by choosing a suitably high temperature and length of drying chamber, no forced draft would be required. It is obvious that with such a method no moisture will be deposited upon the conductor by contact with the surrounding air.

Ordinarily, in treating fibrous materials with cellulose acetate, difficulty has been encountered in obtaining a thorough penetration of the cellulose acetate solution into the pores and interstices of the material and down to the very wire itself. This has been found to be due somewhat to the fact that the fibrous materials are naturally repellent to the rather thick cellulose acetate solution and also because the cellulose acetate solution does not displace the air in the inner layers of the material. It has been found, however, that when an insulated conductor is first impregnated with a solvent, such as acetone, used in the preparation of the cellulose acetate solution, and the conductor so treated is then freed of the liquid solvent to such an extent that only a portion of the vapor remains, and is then immersed in a cellulose acetate solution, the insulated conductor is impregnated down to the wire and the defects heretofore encountered are obviated.

Figure 3:
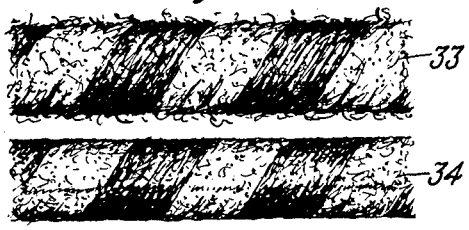
Fig. 3 is a plan view illustrating two portions of an insulated conductor, one of which is untreated and the other of which is treated in accordance with the invention.

The evaporation of the acetone in the chamber 22 leaves a moisture resisting insulated covering upon the wire in which the fibres of insulation are enclosed in a solid matrix of cellulose acetate. The cellulose acetate, in drying, causes a shrinking down of the fibres and produces a solid tube-like insulation which is smaller in diameter than the original unimpregnated loose insulation. This is illustrated more clearly in Fig. 3 which is a copy of a photograph showing a portion 33 of a cotton covered wire which is unimpregnated and a portion 34 of the same conductor impregnated in accordance with the invention. It will be seen that on the conductor 34, the impregnating process has reduced the space occupied by the insulation, thereby permitting a greater number of conductors to be enclosed in a given space in a switchboard cable when capacity considerations admit of it. This solid matrix of cellulose acetate which has a glossy finish is obtained, in accordance with the invention, by preventing the deposition of moisture on the impregnated conductor during the drying operation. If the dew point and the relative temperatures of the conductor and the surrounding air in the drying chamber are such as to allow any lowering of the temperature below the dew point, it has been found that the cellulose acetate immediately becomes flaky and the tube-like matrix structure is destroyed.

Figure 4:
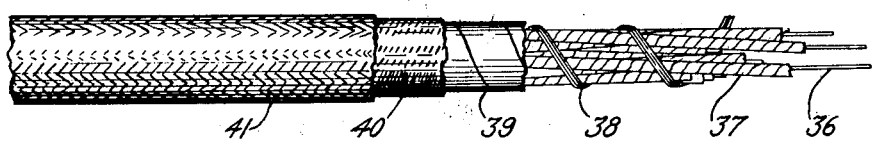
Fig. 4 is a view of a switchboard cable constructed in accordance with the invention.

Fig. 4 shows one form of a switchboard cable prepared in accordance with the invention. This cable consists of a plurality of copper conductors 36 which may, if desired, be tinned to facilitate soldering operations. The conductors 36 are each covered with one or more layers of cotton insulation 37 and impregnated with cellulose acetate in accordance with this invention. The insulated conductors are twisted in pairs and the bundle grouped together by means of a serving of cotton yarn 38 and a spirally served paper strip 39, and are overwound with a fabric tape 40 and a braided fabric cover 41. If desired, the outer cover 41 may be provided with a coating of fire-proof paint. Other and different covering materials may also be employed. The outer cover 41 may also be impregnated with cellulose acetate in the manner described above to further increase the moisture resisting qualities of the cable. This precaution may be desirable where the cable is to be used in localities where extremely high and rapidly changing humidity and temperature conditions are encountered.

Exhaustive tests have been made which illustrate the efficiency of an insulated conductor prepared in the manner described above. The table given below illustrates the average results of prolonged tests made in connection with cellulose acetate impregnated cotton covered wire, untreated cotton covered wire and untreated tussah silk floss covered wire under varying humidity conditions. These tests were conducted in a humidity room maintained at a constant temperature of 85° Fahrenheit for several weeks. The humidity, however, was varied at times from day to day, and at times was maintained constant for two or more days, and the electrical tests were made after the three samples of conductor had been subjected to the same given humidity conditions for at least 24 hours. The figures represent the direct current insulation resistance in megohms per fifty feet of No. 22 B. & S. gauge conductor.

D. C. Insulation resistance—Megohms per 50 feet of conductor

| Insulation | 1" day H. 65% | 2" day H. 75% | 3" day H. 85% | 4" day H. 90% | 8" day H. 65% | 9" day H. 75% | 10" day H. 85% | 11" day H. 90% | 12" day H. 85% |
|---|---|---|---|---|---|---|---|---|---|
| Cellulose acetate cotton | 118.5 | 23.6 | 2.02 | .352 | 58.8 | 14.4 | 1.25 | .518 | .856 |
| Untreated cotton | .373 | .093 | .009 | .004 | .0200 | .0068 | 0 | .006 | .011 |
| Untreated tussah silk floss | 119.3 | 13.2 | .246 | .021 | 14.4 | 1.89 | .018 | .008 | .024 |

*Insulation resistance—Megohms per 50 feet of conductor—Continued*

| Insulation | 13" day H. 75% | 15" day H. 65% | 16" day H. 65% | 17" day H. 90% | 18" day H. 90% | 19" day H. 90% | 20" day H. 90% | 22" day H. 90% |
|---|---|---|---|---|---|---|---|---|
| Cellulose acetate cotton | 4.73 | 19.8 | 31.5 | .546 | .325 | .279 | .231 | .111 |
| Untreated cotton | 0.38 | .112 | .136 | .010 | .007 | .006 | .004 | .002 |
| Untreated tussah silk floss | .181 | 1.39 | 2.37 | .011 | .003 | .004 | .001 | .0003 |

From the above table it will be seen that the insulation resistance of the conductor prepared in accordance with the invention is much superior to that of the untreated cotton covered conductor or the untreated tussah silk floss covered conductor under varying humidity conditions. While the insulation resistance of the silk floss covered conductor is slightly higher than the insulation resistance of the cellulose acetate cotton covered conductor after being subjected to a relative humidity of 65% on the first day, it will be noted that this condition is reversed at the end of the second day when both conductors have been subjected to a relative humidity of 75%. On the third and fourth days, after being subjected to humidity conditions of 85% and 90%, the insulation resistance of the conductor prepared in accordance with the invention is much higher than that of either the untreated cotton covered conductor or the untreated silk floss conductor. On the fifth day, the humidity was dropped from 90% to 65% to determine the manner in which the several conductors would recover from the effects of the extremely high humidity to which they were subjected on the fourth day. The results, as may be seen from the table, indicate the vastly superior qualities of the cellulose acetate impregnated cotton insulation. The varying humidity conditions to which the several conductors were subjected throughout the test, while severe, nevertheless indicate the conditions to which the switchboard cable may be subjected under actual operating conditions. The humidity under actual operating conditions while high is always less than 100%, or actual water deposition.

The efficiency of switchboard cable made of conductors prepared in accordance with the invention for the purposes of telephonic communication is illustrated graphically in Fig. 5. Such cables must have a low leakage from wire to wire, which may be expressed as a conductance, for the efficient transmission of speech, otherwise the voice currents would be greatly attenuated by such wire-to-wire leakage during transmission. Fig. 5 represents such leakage measured as a conductance in microhms per fifty feet of a pair of No. 22 B. & S. gauge conductors at 1,000 cycles per second, which frequency represents practical operating conditions. The curve "H" represents the humidity to which the conductors were subjected from day to day over a period of several weeks. The curve 1 represents the leakage between the untreated cotton insulated conductors, while curve 2 represents the leakage between the untreated tussah silk floss insulated conductors, and the curve 3 represents the leakage between the cellulose acetate impregnated cotton covered conductors constructed in accordance with the invention. It will be seen that the leakage of the cotton insulated conductors increases rapidly with the relative humidity, rendering the conductors highly inefficient for purposes of telephonic communication under humidity conditions which are encountered in ordinary telephone practice. The leakage of the silk floss covered conductors likewise increases rapidly under rising humidity conditions, although to a somewhat less extent than the cotton covered conductors. Curve 3 indicates, however, that the leakage of the cellulose acetate impregnated cotton covered conductors constructed in accordance with the invention, varies unappreciably under substantially all humidity conditions encountered.

It will be seen from the above that the electrical characteristics of conductors prepared in accordance with this invention are materially improved, and that a switchboard cable prepared in this manner may be operated efficiently under all conditions of operation which are encountered in a telephone exchange.

A particular advantage of the invention is the conversion of the cotton, which is cheap but which possesses a poor insulation resistance in moist air, into a condition such that it has a higher insulation resistance in moist air than the more expensive silk which has heretofore been employed in the manufacture of switchboard cables.

While the invention has been described with particular reference to cotton covered conductors, it is to be understood that it is equally applicable to conductors insulated with other materials.

The invention is also capable of other modifications and adaptations not specifically referred to but included within the scope of the appended claims.

What is claimed is:

1. The method of treating an insulated conductor which comprises impregnating the insulation with a non-hygroscopic cellulose solvent, then impregnating said insulation with non-hygroscopic cellulose acetate and allowing the solvent to evaporate.

2. The method of treating the insulation of an electrical conductor which comprises impregnating the insulation with a non-hygroscopic cellulose solvent, subjecting the impregnated insulation to the action of dry air, then impregnating said insulation with non-hygroscopic cellulose acetate, and allowing any excess solvent to evaporate.

3. The method of treating an insulated conductor which comprises displacing the air in the insulation with a cellulose solvent vapor, impregnating the insulation with cellulose acetate, and allowing the vapor to evaporate.

4. The method of treating an insulated conductor which comprises displacing the air in the insulation with a solvent of cellulose acetate, impregnating the insulation with a solution of cellulose acetate, and allowing the solvent to evaporate.

5. The method of treating an insulated conductor which comprises displacing the air in the insulation with the vapor of a cellulose solvent, impregnating the insulation with non-hygroscopic cellulose acetate, and driving off the vapor.

6. The method of treating an insulated switchboard cable conductor which comprises impregnating the insulation with a solvent of cellulose acetate, impregnating said insulation with a solution of non-hygroscopic cellulose acetate, allowing the solvent to evaporate, and preventing the deposition of moisture on the conductor while in the wet condition.

7. The method of treating fibrous insulation which comprises impregnating the insulation with a solvent of cellulose acetate, subjecting said insulation to the action of moisture-free air, impregnating said insulation with a solution of cellulose acetate, and maintaining the relative temperatures during the drying operation of the impregnated coating and the atmosphere surrounding said coating such that the evaporation of the cellulose acetate solvent will not cool the impregnated coating sufficiently to cause its temperature to reach the dew point of the surrounding atmosphere whereby the deposition of moisture is prevented.

8. The method of treating an insulated switchboard cable conductor which comprises replacing the air in the insulation with acetone vapor, and then impregnating said insulation with non-hygroscopic cellulose acetate.

9. The method of treating a cotton-insulated switchboard cable conductor which comprises impregnating the insulation with acetone, partly drying the insulation, impregnating the insulation with a solution of cellulose acetate and acetone, and allowing the acetone to evaporate.

10. The method of treating an insulated switchboard cable conductor which comprises impregnating the insulation with chemically pure acetone, partly drying the insulation in an atmosphere maintained at a temperature approximating the boiling point of acetone, impregnating the insulation with a solution of acetone and cellulose acetate, allowing the acetone to evaporate, and maintaining the temperature of the air surrounding the impregnated conductor during the drying operation such that the evaporation of the acetone will not cool the impregnating coating to such a degree as to cause it to reach the dew point of the surrounding atmosphere, thereby preventing the deposition of moisture upon the impregnated conductor.

JOHN H. WHITE.